(12) United States Patent
Johnston

(10) Patent No.: US 8,662,070 B2
(45) Date of Patent: Mar. 4, 2014

(54) COOKING SYSTEM FOR GAS GRILLS

(75) Inventor: Robert L. Johnston, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 1063 days.

(21) Appl. No.: 12/406,741

(22) Filed: Mar. 18, 2009

(65) Prior Publication Data
US 2009/0239187 A1 Sep. 24, 2009

Related U.S. Application Data

(60) Provisional application No. 61/037,477, filed on Mar. 18, 2008.

(51) Int. Cl.
A47J 37/07 (2006.01)

(52) U.S. Cl.
USPC ......... 126/39 J; 126/25 R; 126/25 A; 432/31; 99/451

(58) Field of Classification Search
USPC ............ 126/25 R, 25 A, 39 J; 432/31; 99/451
See application file for complete search history.

(56) References Cited

U.S. PATENT DOCUMENTS

| 3,684,260 | A | * | 8/1972 | Solbrig | 432/31 |
| 4,321,857 | A | | 3/1982 | Best | |
| 4,561,419 | A | | 12/1985 | Koziol | |
| 4,899,724 | A | | 2/1990 | Kuechler | |
| 5,190,027 | A | * | 3/1993 | Miceli | 126/41 R |
| 5,355,868 | A | | 10/1994 | Haen | |
| 5,502,788 | A | * | 3/1996 | Platsch | 392/424 |
| 5,638,808 | A | * | 6/1997 | Home | 126/41 R |
| 5,782,230 | A | * | 7/1998 | Linnebur et al. | 126/41 R |
| 6,114,666 | A | | 9/2000 | Best | |
| 6,279,566 | B1 | | 8/2001 | Craven, Jr. | |
| 7,487,717 | B2 | * | 2/2009 | Lauro | 99/445 |
| 2005/0284145 | A1 | * | 12/2005 | Repetto et al. | 60/641.8 |
| 2006/0021517 | A1 | | 2/2006 | Best | |
| 2007/0125357 | A1 | | 6/2007 | Johnston | |
| 2008/0072890 | A1 | | 3/2008 | Best | |
| 2008/0216813 | A1 | * | 9/2008 | Pai | 126/25 R |
| 2009/0199841 | A1 | * | 8/2009 | Tsung | 126/25 R |

* cited by examiner

Primary Examiner — Steven B McAllister
Assistant Examiner — Ko-Wei Lin
(74) Attorney, Agent, or Firm — Fellers, Snider, Blankenship, Bailey & Tippens, P.C.; David G. Woodral

(57) ABSTRACT

A gas cooking grill is disclosed. The cooking grill has a firebox having a combustive heat source near the bottom therein, a cooking surface disposed along an upper portion of the firebox, and a convex intermediate element interposing the burner and the cooking surface, the intermediate element having an apex near the cooking surface and sides spaced apart from the cooking surface.

9 Claims, 5 Drawing Sheets

COOKING SYSTEM FOR GAS GRILLS

CROSS REFERENCE TO RELATED APPLICATIONS

This application claims the priority of U.S. Provisional Patent Application No. 61/037,477 entitled "COOKING SYSTEM FOR GAS GRILLS," filed Mar. 18, 2008, the contents of which are hereby incorporated by reference.

FIELD OF THE INVENTION

This invention relates to gas cooking grills in general and, more specifically to a device and method for providing even cooking temperatures on a gas grill.

BACKGROUND OF THE INVENTION

Until recently, most gas grills were built using atmospheric gas burners that mixed gas and some (primary) air and then expelled that mixture through small burner ports where additional (secondary) air was mixed by contact and ignition produced sustained flame. The heated mixture of combustion products and air was then used to heat food on open grates above the burner. Various materials in various configurations were often placed between the burner and the food to manipulate the flow of hot air, control the flow of grease and water from the food products, provide a surface for grease vaporization that would induce specific flavor in the meat product, and provide some secondary heating by radiation. An exception to this construction was the cooking system using infrared radiation patented by Willie H. Best in U.S. Pat. No. 4,321,857.

In recent years, following expiration of the '857 patent, further developments in cooking systems have been made, including U.S. Pat. No. 6,114,666 awarded to Best, which features an infrared re-emitter between the heat source and the food. Further applications by Best have been made, including US2006/0021517 and 60/847,281, that describe two more methods of using infrared re-emitters. However, although representing many advantages over prior art, the new systems have some limitations. First, they are complex and difficult to build, requiring significant precision of manufacture. Second, by their nature they hide the burner flame, suppressing an intuitive visible indication to the operator about the state of the burner system. Third, there is no flame around the cooking meat in almost any condition, depriving the consumer of an important psychological signal of the cooking event.

One attempt to address these shortcomings has been made in the patent application of Johnston, US 2007/0125357, that uses a perforated plate with food support ribs and cooks with a mixture of convective heat and infrared radiation. The perforations in the plate allow the burner flame to be seen, and to some extent grease dripping though the perforations and igniting below the perforated plate will be visible. Furthermore, the food support ribs and the perforated plate fairly effectively suppress any flame around the food. However, this type of construction is complex and difficult to manufacture and is particularly difficult to clean of food debris trapped between the food support ribs.

What is needed is a device and method for addressing the above, and related, issues.

SUMMARY OF THE INVENTION

The present invention disclosed and claimed herein, in one aspect thereof, comprises a gas cooking grill. The grill has a firebox with a combustive heat source near the bottom therein, and a cooking surface disposed along an upper portion of the firebox. A convex intermediate element interposes the burner and the cooking surface, the intermediate element having an apex near the cooking surface and sides spaced apart from the cooking surface.

In some embodiments, the sides of the intermediate element have a plurality of holes defined therein. The holes may be defined proximate the sides of the intermediate element.

In some embodiments, a distance from the apex of the intermediate element to a bottom of the sides of the intermediate element is from 60 to 100 percent of a distance from the heat source to the cooking surface. A distance from a plane containing the heat source to the bottom of the intermediate element may be from 0 to 55 percent of a distance from the plane to the cooking surface. A distance between the bottom sides of the intermediate element may be from 30 to 90 percent of the distance between two sides of the firebox at the level of the heat source.

The intermediate element may be formed from a single radius, or formed from a plurality of blended radii. The intermediate element also may contain at least one tangent section and/or at least one parabolic section.

DETAILED DESCRIPTION OF THE PREFERRED EMBODIMENTS

Figure 1:
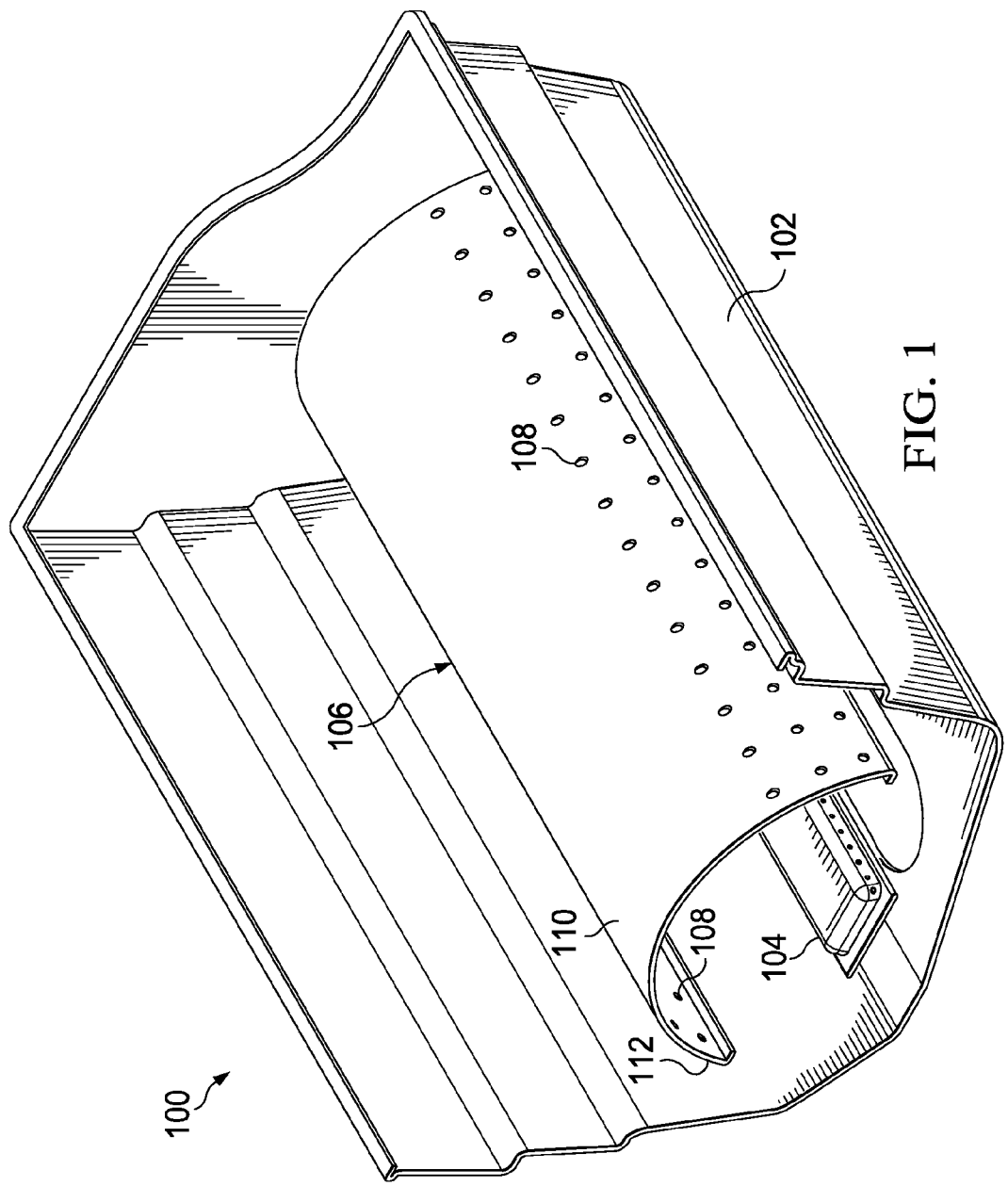
FIG. 1 is a partial cutaway perspective view of one embodiment of a gas grill according to aspects of the present disclosure.

Referring now to FIG. 1, a partial cutaway perspective view of one embodiment of a gas grill according to aspects of the present disclosure is shown. The grill 100 has a burner 104 that may be adapted to burn propane, butane, natural gas, or any other gas commonly available to consumers. The burner 104 sits in a firebox 102 that may be supported by a stand (not shown). The firebox 102 could also be attached to a mobile platform or attached permanently (e.g., enclosed by masonry).

An arched or convex intermediate element 106 may be placed around the burner 104. A substantially rounded apex 110 of the element 106 may sit directly above the center of the burner 104. Sides 112 of the element 106 may contain a number of small holes 108. The exact geometry of the intermediate element 106 may be important to functionality of the grill 100 and will be described in greater detail below. The intermediate element 106 may be made from any food-safe fire resistant material. In one embodiment, the intermediate element 106 comprises porcelainized steel.

Figure 2:
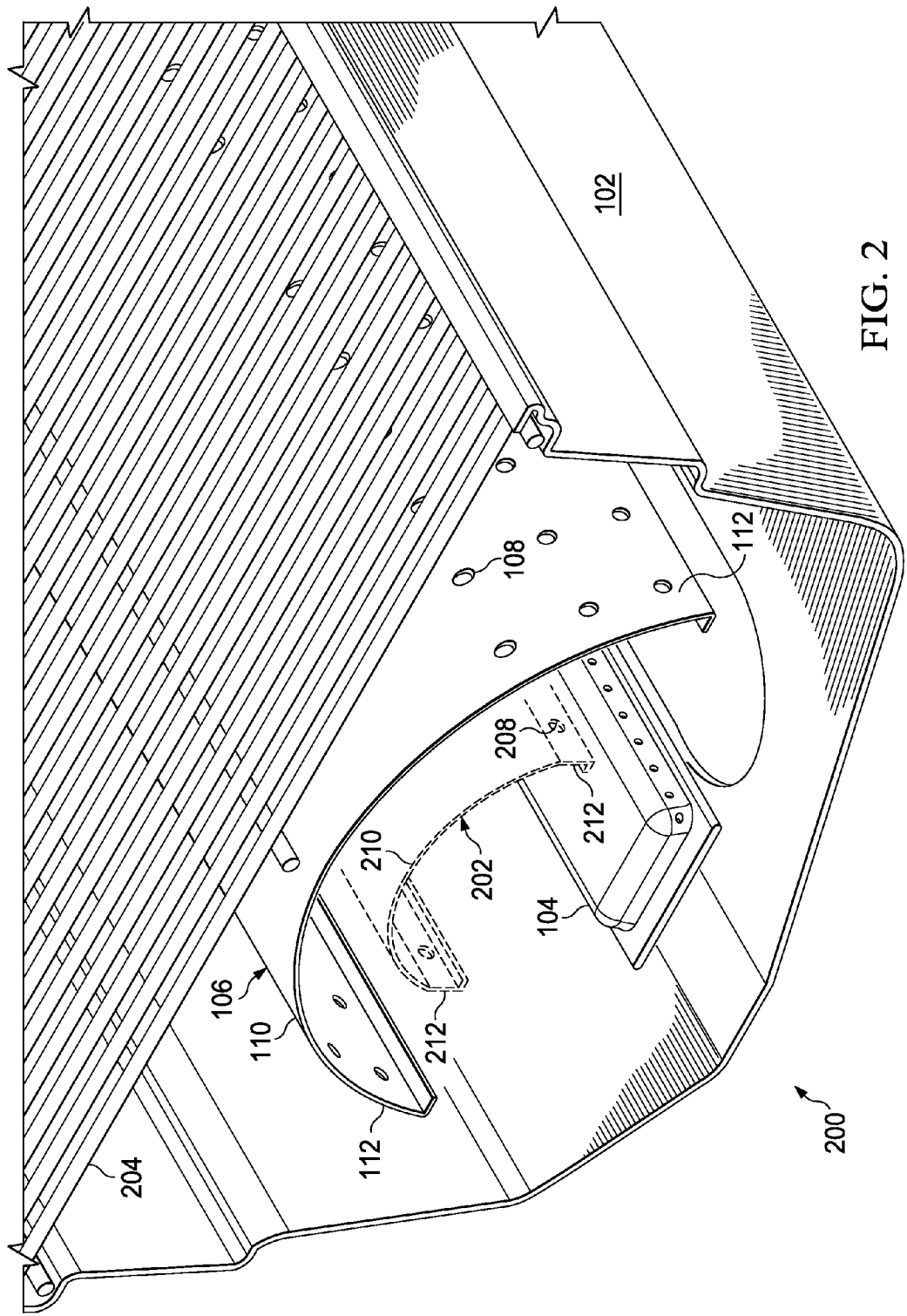
FIG. 2 is a partial cutaway perspective view of another embodiment of a gas grill according to aspects of the present disclosure.
Figure 3:
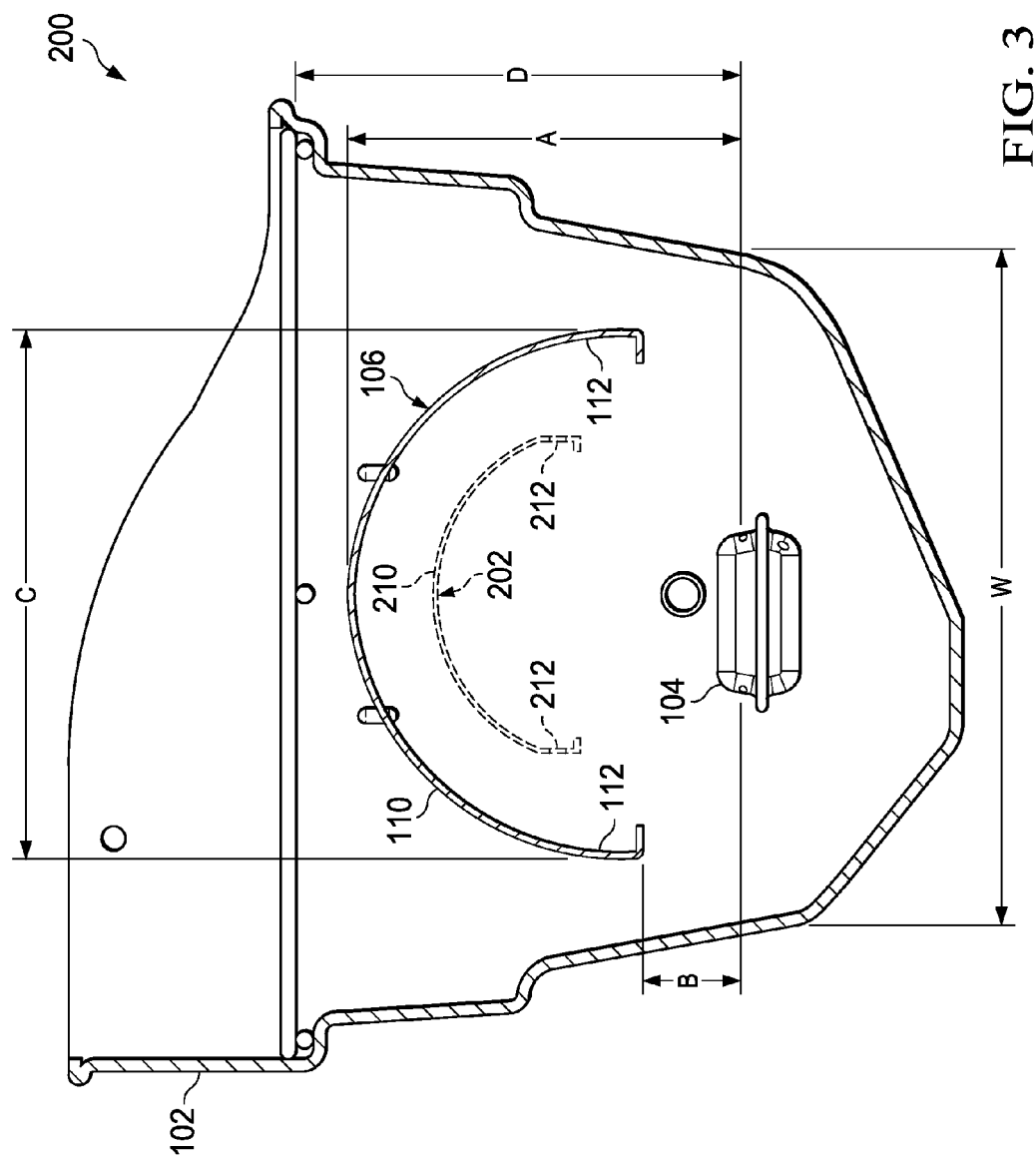
FIG. 3 is a partial cutaway end view of the gas grill of FIG. 2.

Referring now to FIG. 2, a partial cutaway perspective view of another embodiment of a gas grill according to aspects of the present disclosure is shown. The grill 200 shares many similarities with grill 100 of FIG. 1. However, it can be seen that the shape of the firebox 102 has changed slightly relative to that of FIG. 1. FIG. 2 also shows, in phantom, another embodiment of a convex intermediate element 202 having sides 212, defining holes 208, and an apex 210. This element 210 could be used instead of the convex intermediate element 106. It is understood that the grill 200 will have only one intermediate element 106 or 202. However, two are shown in FIGS. 2 and 3 to illustrate that a range of various sizes are possible. The geometries and sizes contemplated are discussed below with respect to FIG. 3. The grill 200 is also shown with the grating 204 in place in order to clarify that the intermediate elements 106 and 202 are convex toward the food support grate 204 above the burner 104.

For both grills 100, 200 convective heat generated by the gas burner 104 is trapped in the intermediate element 106, 202 in the apex 110, 210 and primarily escapes through the holes 108, 208 in the sides 112, 212 of the intermediate element 106, 202, though some convective heat may exit at the ends of the arch in the gap between the intermediate element and the firebox 102 in which the burner 104 is located. Convective heating may also occur from around the sides 112, 212 of the intermediate element 106, 202.

The trapped heat and the passage of heat through the small holes 108, 208 heats the material of the intermediate element 106, 202 until it emits very significantly in the infrared, of an order of magnitude of 50% of the burner input energy based on measurements and calculations of the area, temperature, and emissivity of the intermediate element material. Food on the cooking grate 204 may be heated by a combination of radiant heat and convective heat, with radiant heat providing in the order of 50% of the heating to the food.

The sides 112, 212 of the intermediate element 106, 202 may be hotter than the apex 110, 210 because the convective heat vent holes 108, 208 create a greater heat transfer to the material than the stagnant, though still hot, gas trapped in the apex 110, 210 of the intermediate element 106, 202. Because of the convex shape of the intermediate element 106, 202 relative to the food support grate 204, the hotter surfaces of the side 112, 212 are further away from the food support grate 204 than the cooler surfaces of the apex 110, 210 of the element 106, 202. By well known laws of physics, the greater distance attenuates the radiative heating and so the temperature distribution from radiation across the surface or grate 204 is relatively even.

Referring now to FIG. 3, a partial cutaway end view of the gas grill of FIG. 2 is shown. The distance from a row of burner ports on burner 104 (where combustion takes place as the gaseous fuel mixture exits the burner) to the bottom of the cooking grate is shown as distance D. In some embodiments, the location and size of this arched or convex intermediate element 106, 202 will be defined in terms of the distance D and a further distance W, which is the distance between the sides of the firebox 102 at the level of the burner ports on the burner 104. Only certain sets of parameters allow maximum control of flare-ups, even distribution of combined convective and radiant heat, and proper combustion characteristics. FIG. 3 illustrates two of a number of intermediate elements that satisfy these characteristics.

The shape of the intermediate element 106 or 202 can be defined as follows for one embodiment:

A=the distance from the vertical location of the burner ports to the top of the arched structure and is 60% to 100% of the distance D.

B=the distance from the plane of the burner ports to the bottom edges of the arched structure and is 0% to 55% of the distance D.

C=the distance between the bottom of the two sides 112 of the intermediate element 106 and is 30% to 90% of W.

The convex shape of the intermediate element 106, 202 may be formed by a single radius, by several blended radii, by a combination of a radius and tangent sections, by a parabola and by several other means known to the art to produce a generally smooth convex curved envelope that defines the intermediate element 106, 202.

Variation of these parameters discussed above requires variation of the number, size and spacing of holes 108, 208 shown in the sides 112, 212 of the intermediate element 106, 202. In some combinations of parameters, satisfactory performance can be achieved without any of these ventilation holes 108, 208 in the sides 112, 212.

One characteristic of an intermediate element 106, 202 constructed to the geometry described is that the lower parts of the intermediate element 106, 202 become hotter than the upper part of the intermediate element. Since the lower parts are further away from the cooking grate than the upper parts, the heat transferred by radiation is diminished so that the total heat transfer to the grate tends to be equalized between the cooler parts closer to the grate and the hotter parts farther away from the grate. Although radiant heat is only part of the heating effect produced, the overall effect is more even heat distribution across the cooking area defined by the grate 204.

Methods of constructing a cooking system according to the present disclosure are simple and uncomplicated. In one embodiment, the customary vaporizer bar/port shield described initially in current art is replaced with the special convex intermediate element 106, 202 of the present disclosure. The burner flames are visible to the operator through the small holes 108, 208 on the sides 112, 212 of the arch 106, 202, providing feedback about operating condition of the burner 106, 202.

Meat or other foods cooking on the food support grate 204 may shed grease onto the hot surface of the element 106, 202. This may provide visible flame and smoke around the food. However, since the grease rapidly travels down the steep sides 112, 212 of the arch 106, 202, persistent flame does not contact the food, which is favorable to avoid charring (especially of the meat surface).

The high level of infrared heat as described above produces benefits with respect to greater moisture retention due to less heat being transferred convectively, which tends to pull moisture out of the meat. The heat transfer mechanism of the present grill 100, with all convective heat being sent to the periphery of the cooking chamber and infrared heat in the center, provides measurably better evenness of heat across the cooking surface 204.

The performance of the intermediate element 106 in a cooking application can be shown by comparing performance of a traditional grill, in which the intermediate element is an inverted V shaped member, with a grill having the afore-described intermediate element 106. Substitution of the convex intermediate element as described showed results in Table 1 where the difference in standard deviation and coefficient of variation of the range of temperatures is provided. This shows a 61.7% reduction in the coefficient of variation, a commonly used statistical measurement of performance.

TABLE 1

Heat distribution measured with thermocouple array on top of cooking grate

Standard grill with V shaped intermediate element

| | | | | | |
|---|---|---|---|---|---|
| 644 | 830 | 732 | 743 | 622 | 714 average temp F. |
| 669 | 710 | 730 | 707 | 656 | 69.4 standard deviation temp F. |
| 659 | 867 | 762 | 758 | 626 | 9.7% coefficient of variation, % |

Grill with convex intermediate element

| | | | | | |
|---|---|---|---|---|---|
| 622 | 637 | 640 | 643 | 602 | 640 average temp F. |
| 672 | 668 | 663 | 679 | 662 | 23.9 standard deviation temp F. |
| 626 | 636 | 625 | 637 | 596 | 3.7% coefficient of variation % |

Figure 4A:
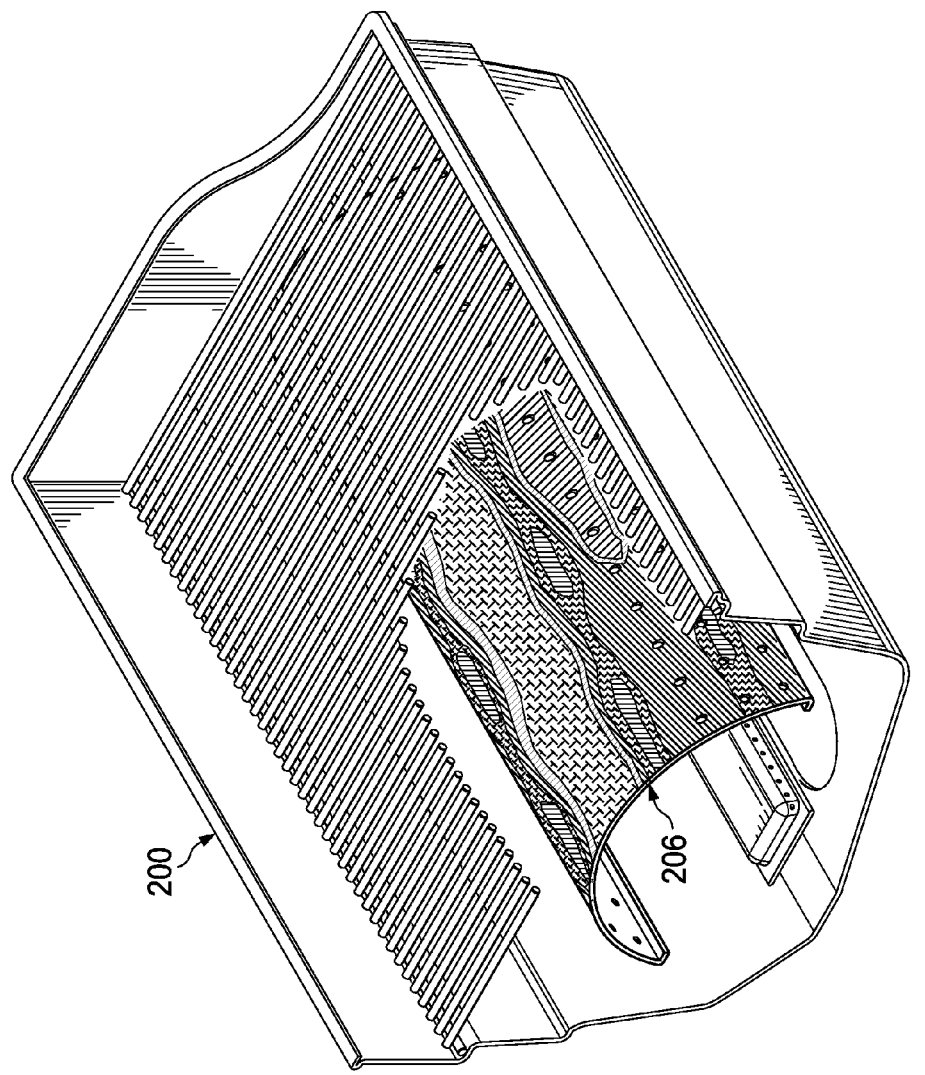
FIG. 4A is a shaded illustration of a temperature distribution of a convex intermediate element of the present disclosure in a gas grill.
Figure 4B:
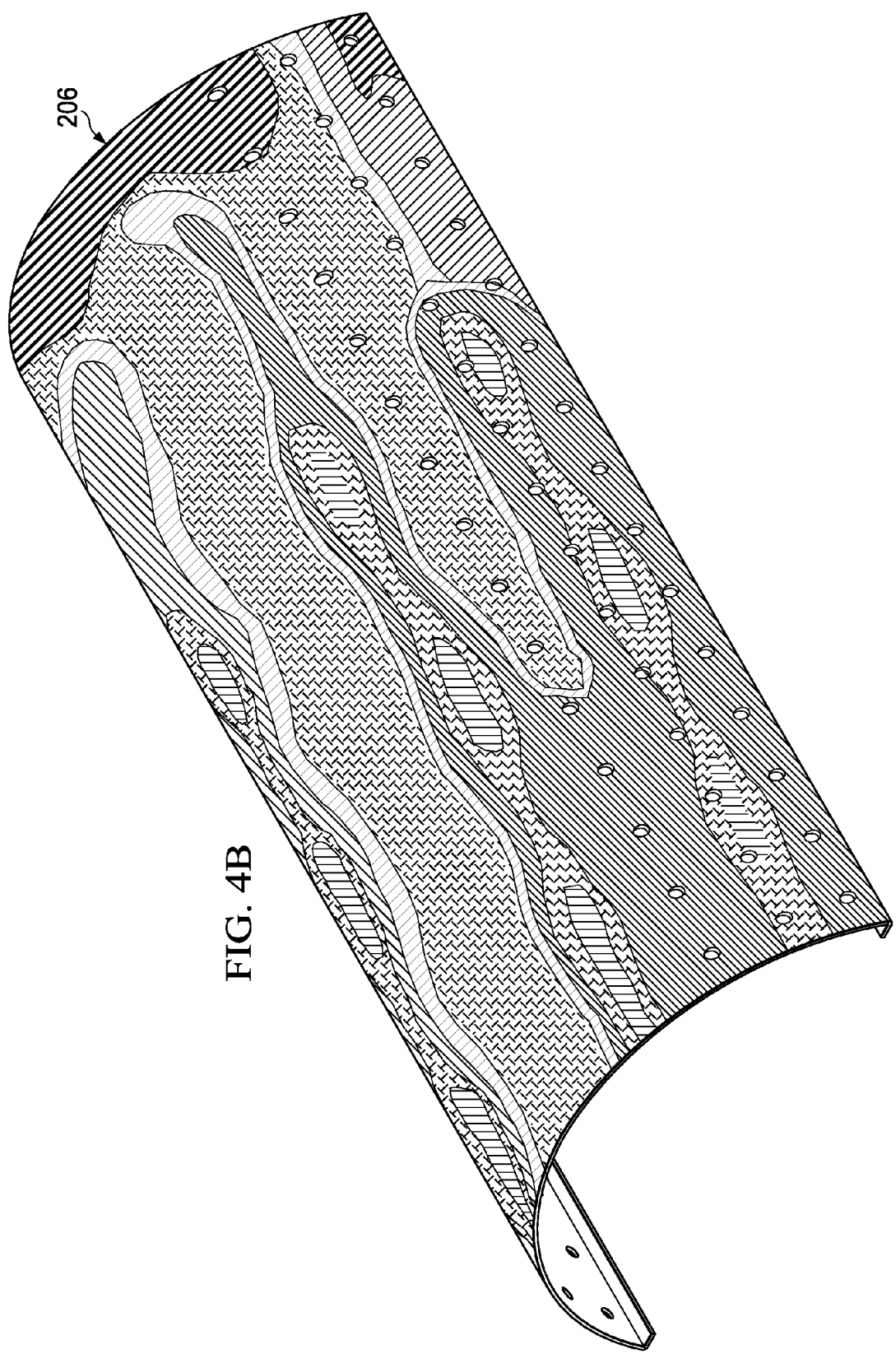
FIG. 4B is a shaded illustration of the intermediate element of FIG. 4A removed from the grill.

Viewing the actual heating characteristics of the intermediate member 106 is also instructive. Referring now to FIG. 4A, a shaded illustration of a temperature distribution of a convex heating element of the present disclosure in a gas grill is shown. Referring also to FIG. 4B, a shaded illustration of the heating element of FIG. 4A removed from the grill is shown. The figures are the result of a computational fluid dynamics study of heat transfer to the convex intermediate element. Here, the elevated temperatures along the bottom and reduced temperatures in the upper portions can be seen.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A cooking grill comprising:
   a firebox having a combustive heat source near a bottom therein;
   a cooking surface disposed along an upper portion of the firebox; and
   a fixed substantially smooth, convex intermediate element interposing the combustive heat source and the cooking surface, the intermediate element having a continuously curved surface having an apex near the cooking surface, each of the sides spaced apart from the cooking surface and having a portion that is tangent to vertical;
   wherein a vertical distance from the apex of the intermediate element to a bottom of the spaced apart sides is greater than a vertical distance from the bottom of the spaced apart sides to a plane containing a burner port of the heat source;
   wherein the convex intermediate element defines a plurality of holes proximate each of the vertical portions and spaced apart from the apex, wherein hot gas flowing from the plurality of holes heats the spaced apart sides; and
   wherein the convex intermediate element is heated by the combustive heat source and generates infrared energy directed toward the cooking surface;
   the convex intermediate element provides inwardly projecting portions on the spaced apart sides to aid in trapping gases from the combustive heat source.

2. The cooking grill of claim 1, wherein the sides of the intermediate element have a plurality of holes defined therein.

3. The cooking grill of claim 2, wherein the holes are defined proximate the sides of the intermediate element.

4. The cooking grill of claim 1, wherein a distance from the apex of the intermediate element to the bottom of the sides of the intermediate element is from 60 to 100 percent of a distance from the heat source to the cooking surface.

5. The grill of claim 1, wherein a distance from the plane containing a burner port of the heat source to the sides of the intermediate element is from 0 to 55 percent of a distance from the plane to the cooking surface.

6. The grill of claim 1, wherein a distance between the sides of the intermediate element is from 30 to 90 percent of the distance between two sides of the firebox at the level of the heat source.

7. The grill of claim 1, wherein the intermediate element is formed from a single radius.

8. The grill of claim 1, wherein the intermediate element is formed from a plurality of blended radii.

9. The grill of claim 1, wherein the intermediate element contains at least one parabolic section.

* * * * *